United States Patent [19]

Natalizia

[11] 4,235,418
[45] Nov. 25, 1980

[54] BALL VALVE HAVING METAL SEAT RINGS

[75] Inventor: Angelo Natalizia, Cranston, R.I.

[73] Assignee: International Telephone and Telegraph Corporation, New York, N.Y.

[21] Appl. No.: 926,469

[22] Filed: Jul. 20, 1978

Related U.S. Application Data

[62] Division of Ser. No. 725,205, Sep. 22, 1976, Pat. No. 4,126,295.

[51] Int. Cl.³ .............................................. F16K 5/06
[52] U.S. Cl. .................................. 251/359; 251/174; 251/192; 251/368; 251/315
[58] Field of Search ............... 251/159, 160, 162, 315, 251/368, 174, 192, 317, 359

[56] References Cited

U.S. PATENT DOCUMENTS

| | | | |
|---|---|---|---|
| 2,573,177 | 10/1951 | Bohlen | 251/315 X |
| 3,372,901 | 3/1968 | Manor et al. | 251/315 |
| 3,394,915 | 7/1968 | Gachot | 251/315 X |

FOREIGN PATENT DOCUMENTS 1199656  7/1970  United Kingdom ..................... 251/315

Primary Examiner—Arnold Rosenthal
Attorney, Agent, or Firm—John T. O'Halloran; Peter C. Van Der Sluys

[57] ABSTRACT

This relates to a ball valve of the top entry non-spherical type. A soft metal coating is deposited on that portion of the seat ring which contacts the valve member or ball. The ball and seat assembly is inserted into a valve chamber such that the seat rings are in an unstressed condition. After insertion, the ball is rotated 90° causing the ball to engage the soft metal coating, thereby crushing the soft metal to form a tight seal with the ball. In this manner, the lapping process, generally required when metal seats are employed, is eliminated. Further, the seats may be replaced without replacing the ball.

8 Claims, 8 Drawing Figures

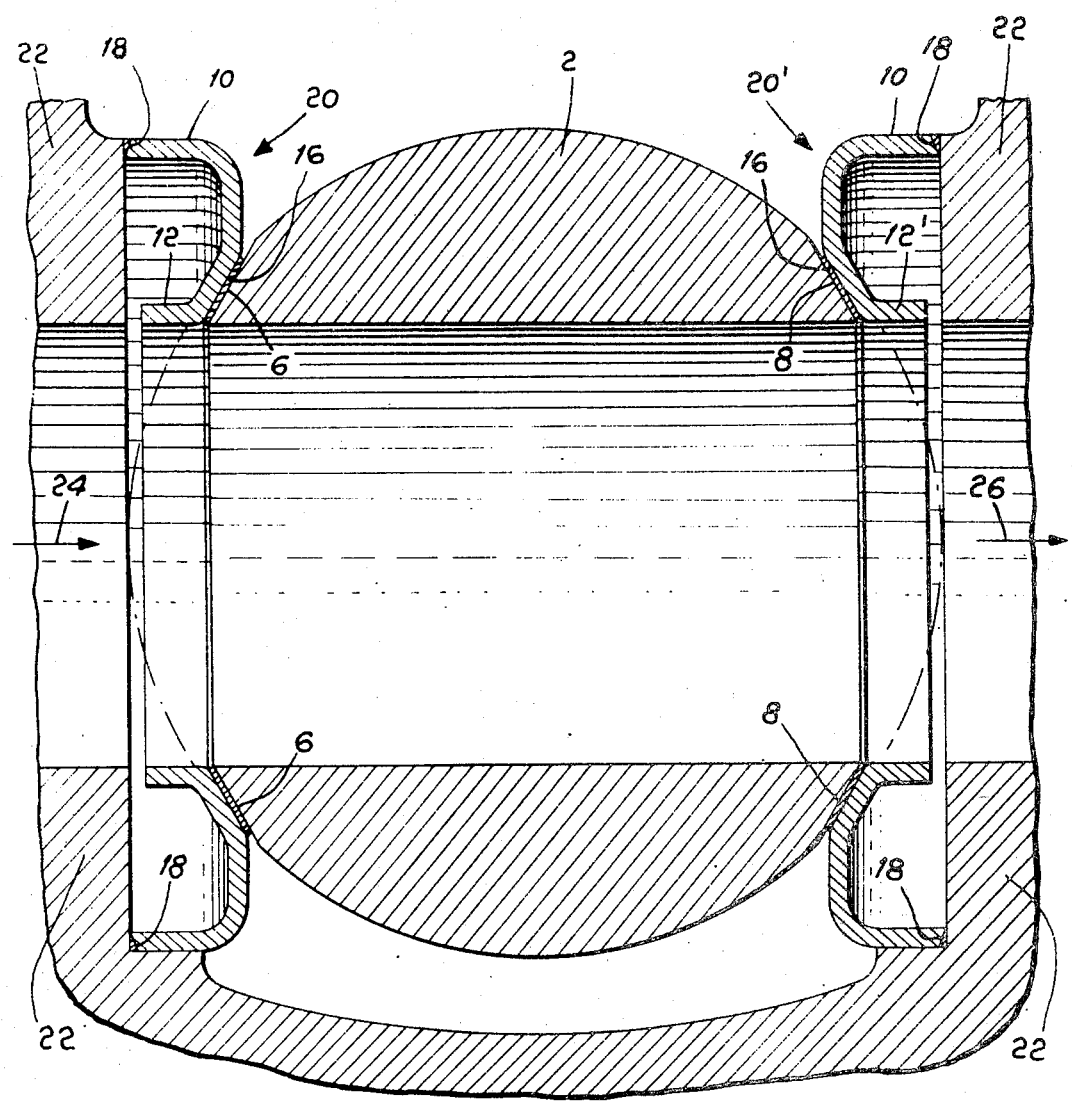

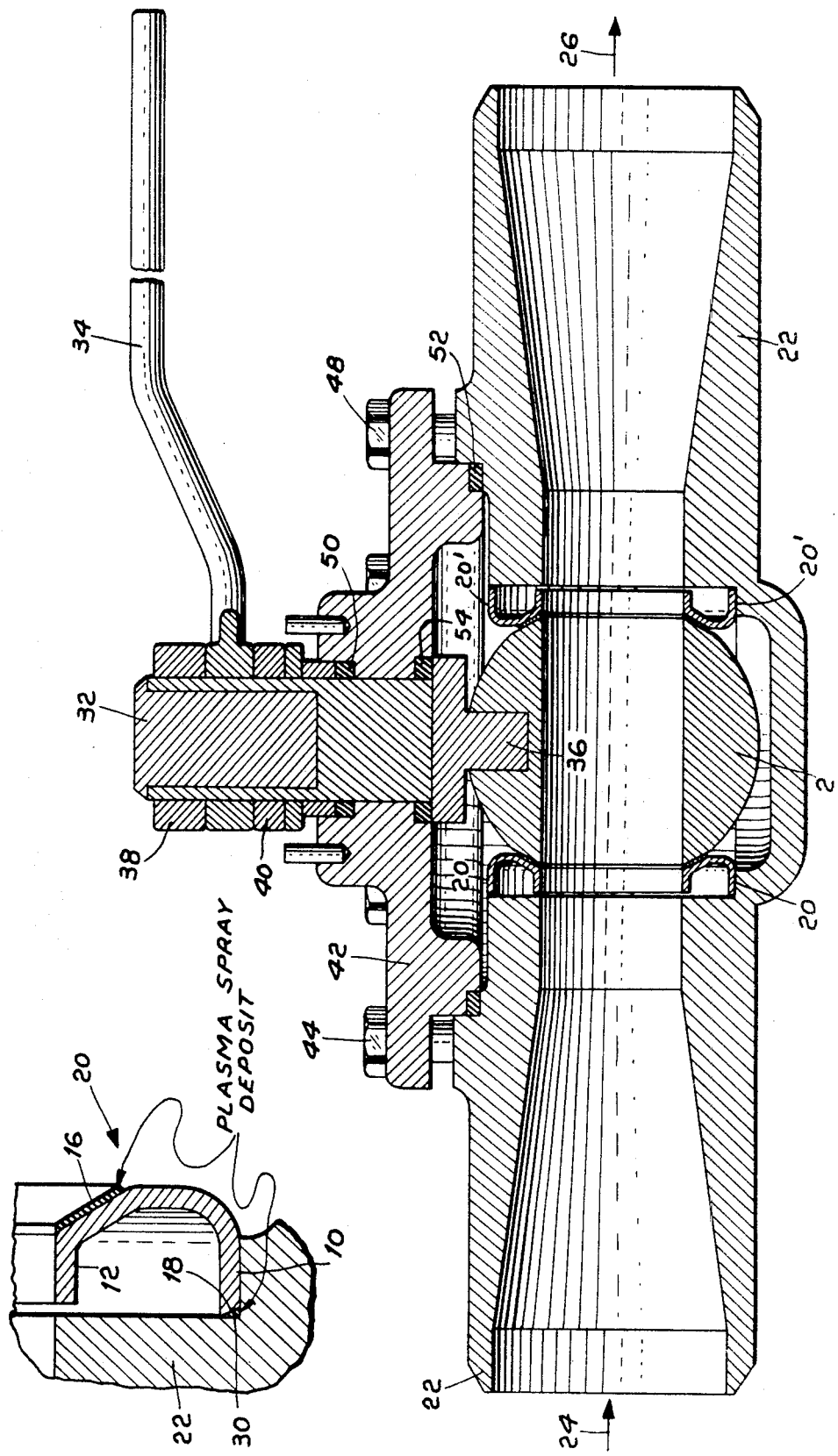

BALL VALVE HAVING METAL SEAT RINGS

This is a division of application Ser. No. 725,205, filed Sept. 22, 1976, U.S. Pat. No. 4,126,295.

BACKGROUND OF THE INVENTION

This invention relates generally to ball valves and, more particularly, to top entry ball valves employing metal seat rings having a soft metal coating thereon.

Ball valves are well known and generally consist of a valve body having a valve chamber, a substantially spherical valve member or ball positioned in the valve chamber, and one or two seat members positioned between the valve member and the ends of the valve chamber. The valve member has an internal passage therethrough which forms a flow path from valve inlet to valve outlet when the valve is in the open position. Means are provided for rotating the ball from an open to closed position and vice versa.

Several techniques have been employed to accommodate rigid seating members while taking full advantage of top entry construction. For example, the valve chamber may be tapered inwardly from the top resulting in an upper opening sufficiently large for insertion and retraction of the ball and seat assembly. Clearly, precautions must be taken when using this type of arrangement to ensure proper sealing between the ball, seat and valve body. For example, springs must be employed to urge the seats downward into position.

Another known solution employs a ball having an axial length substantially less than its diameter. In this way, when the ball is in the open position, it may freely enter the valve housing from a top opening.

A leakage specification of millimeters of hydrostatic medium has developed for metal seated gate and globe valves which enjoy a large mechanical advantage in the creation of pressures on the valve closure member and seats. In contrast, metal seated ball valves, like check valves, have virtually only the line pressure available to create sealing. Metal seated ball and check valves have been unable to meet the above referred to leakage specifications. In order to achieve even a reasonably tight seal, it has in the past been necessary to lap the balls and seat members to masters and then to each other. This creates, in effect, seat members which are matched to a particular ball and thus the seat members cannot be replaced without replacing the ball. Since the lapping process is both time-consuming and expensive, an alternative approach has been sought.

For example, seat rings for ball valves may be formed, in whole or in part, from various flexible materials, e.g., rubber, Teflon, etc. This is especially suitable for top entry ball valves since the flexible seats are easily deformable, thus permitting easy compression of the seats and valve member and insertion, as a unit, into the valve chamber. However, the use of flexible seat rings has presented certain problems. Most seals are of the compression type, i.e., each seat is compressed between the valve member and an end wall of the valve body causing the spherical surface of the ball to maintain intimate contact with the seat, thereby establishing a seal between the valve body and the seat member and between the valve member or ball and the seat member. Obviously, after a period of time, the flexible materials would sufficiently wear, resulting in a decrease of the initial built-in compression reducing the integrity of the seal. Further, such materials are not suitable for high-temperature service in the order of 1,000° F. or cryogenic service where temperatures in the order of −400° F. must be accommodated. At the higher temperatures, the material simply melts, while at the lower temperature the material cracks. For this reason, metal seat rings must be employed at extreme temperatures; however, their greater rigidity makes top entry a problem. Further, metal seated ball and check valves have been unable to meet the above referred to leakage specifications. In fact, the severity of the above mentioned problems has caused certain manufacturers to request that the leakage allowances of metal seated ball valves be made less stringent.

SUMMARY OF THE INVENTION

It is an object of the present invention to provide a metal seat ring for use in a ball valve which will meet current leakage specifications.

It is a further object of the present invention to provide a metal seat ring for use in a ball valve which provides a tight seal without lapping. In accordance with the invention, the seat/ball assembly would not be a matched set, and it would be possible to replace just the seat or seats if they should become damaged or worn.

It is a further object of the present invention that the inventive seat ring be operational at extreme temperatures without deterioration of the seat material.

Finally, it is an object of the present invention to provide a metal seat ring for use in a top entry ball valve. The invention anticipates the use of a non-spherical ball having relieved portions which cooperate with the seats in the open position. This permits easy insertion of the ball/seat assembly into the valve chamber from above.

According to a broad aspect of the invention, there is provided a metallic valve seat, for use in a valve house defining a chamber and inlet and outlet ports, said chamber having a closure member therein, comprising: a first metal portion for engaging said housing around one of said inlet and outlet openings; and a soft metal layer deposited on a region of said first portion for engaging said closure member.

The above and other objects of the present invention will be more clearly understood from the following detailed description taken in conjunction with the accompanying drawings in which:

BRIEF DESCRIPTION OF THE DRAWINGS

FIG. 4 is a cross-sectional view of the inventive seat in engagement with the ball of a ball valve in the open position;

FIG. 6 is a cross-sectional view of an alternate form of ball/seat assembly; and FIG. 7 is a cross-sectional view of an assembled ball valve according to the invention.

DESCRIPTION OF THE PREFERRED EMBODIMENT

Figure 1:
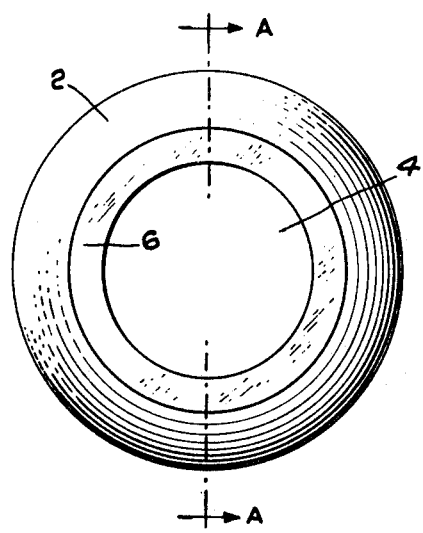
FIG. 1 is a view of a ball for use in a ball valve according to the invention taken along a longitudinal axis of the flow path of the ball.
Figure 2:
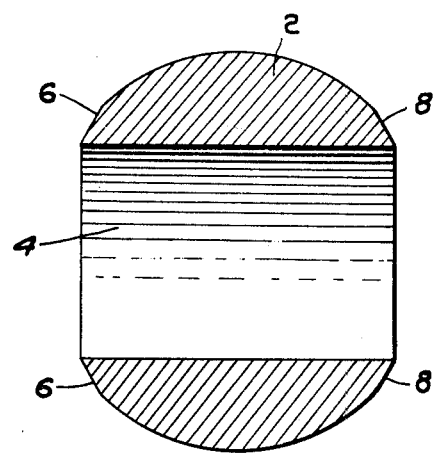
FIG. 2 is a cross-sectional view of the ball of FIG. 1 taken along line A—A.

FIGS. 1 and 2 illustrate a valve member 2 having a bore 4 therethrough for communicating with the inlet and outlet ports of a valve. As can be seen, the valve member has a circular cross-section in a plane perpendicular to the longitudinal axis of the bore 4. However, the section of FIG. 2, taken along a plane parallel to said axis, is not circular. The regions surrounding the periphery of the bore on both the inlet and outlet sides of the valve member are relieved to provide surfaces 6 and 8 respectively on each side of the ball. The use of this type of nonsymmetrical ball in a top entry valve is more fully discussed and described in copending U.S. application Ser. No. 593,098 filed July 3, 1975.

Figure 3A:
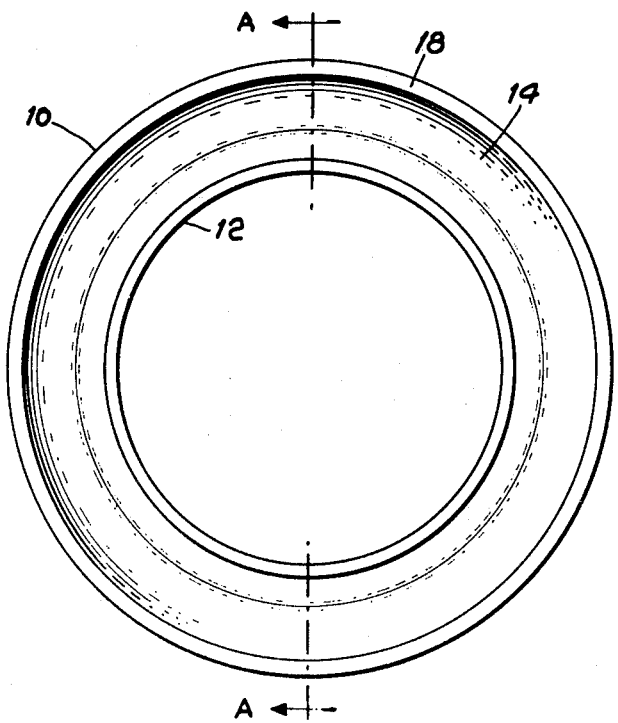
FIG. 3 is a cross-sectional view of the inventive valve seat.
Figure 3B:
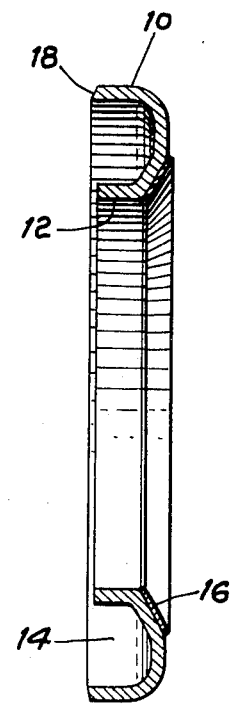

FIGS. 3a and 3b illustrate generally the inventive valve seat, FIG. 3b being a cross-section of FIG. 3a taken along line A—A. The seat ring consists of a generally U-shaped cylindrical structure which may be stamped from a metal sheet having resilient characteristics, e.g. Inconel 718, stainless steel, etc. The legs 10 and 12 of well 14 support the seat against the valve body in a manner to be discussed in detail below. A portion of the seat ring has disposed thereon a soft metal layer 16. Metals such as silver, gold, cadmium, nickel, cooper and certain alloys thereof would be suitable for this purpose and may be formed by plating, plasma spraying or other well known techniques. Leg member 10 has a beveled surface 18 for reasons which will be more fully discussed below.

FIG. 4 illustrates the use of the inventive type seat rings in a ball valve assembly. The assembly consists of ball 2, seats 20 and 20', valve body 22, inlet port 24 and outlet port 26. The valve assembly is shown in the open position. In the open position, relieved surfaces 6 and 8 of the ball 2 merely engage the regions of soft metal on the valve seats 16 and 16', i.e., the relieved surfaces on the ball cooperate with the seats such that the seat material is not compressed. The seat/ball assembly is so dimensioned in the open position to allow easy insertion into the valve chamber from above. In the closed position, the seats are stressed by the spherical surface of the ball, i.e., the spherical surfaces interfere with the relaxed position of the seats. The amount of compression is determined by the interference fit of the spherical surfaces. The ball and valve seats are so assembled prior to entry into the valve chamber. In this manner, the entire assembly may be easily inserted.

It will be noted from FIG. 4 that the beveled edges of the valve seats 18 and 18' engage the valve body 22. The beveled edges provide a line contact which results in a greater seating force per unit area, thereby increasing the effectiveness of the seal. As an alternative to the use of beveled edges 18 and 18', an additional soft metal coating may be employed as is shown at 30 in FIG. 6. This additional coating may likewise be formed by plating or plasma spraying.

The dotted line through regions 16 and 16' indicate the interference fit of the spherical portion of ball 2. Gaps 28 and 28', having a width that is equal to or slightly greater than one-half the interference fit of the ball are provided. In this manner, when the ball is rotated to the closed position, legs 12 and 12' will abut or nearly abut valve body 22 so that in the event of a subsequent pressure surge, legs 10 and 12 will provide sufficient support to prevent collapse of the seat ring.

Figure 5:
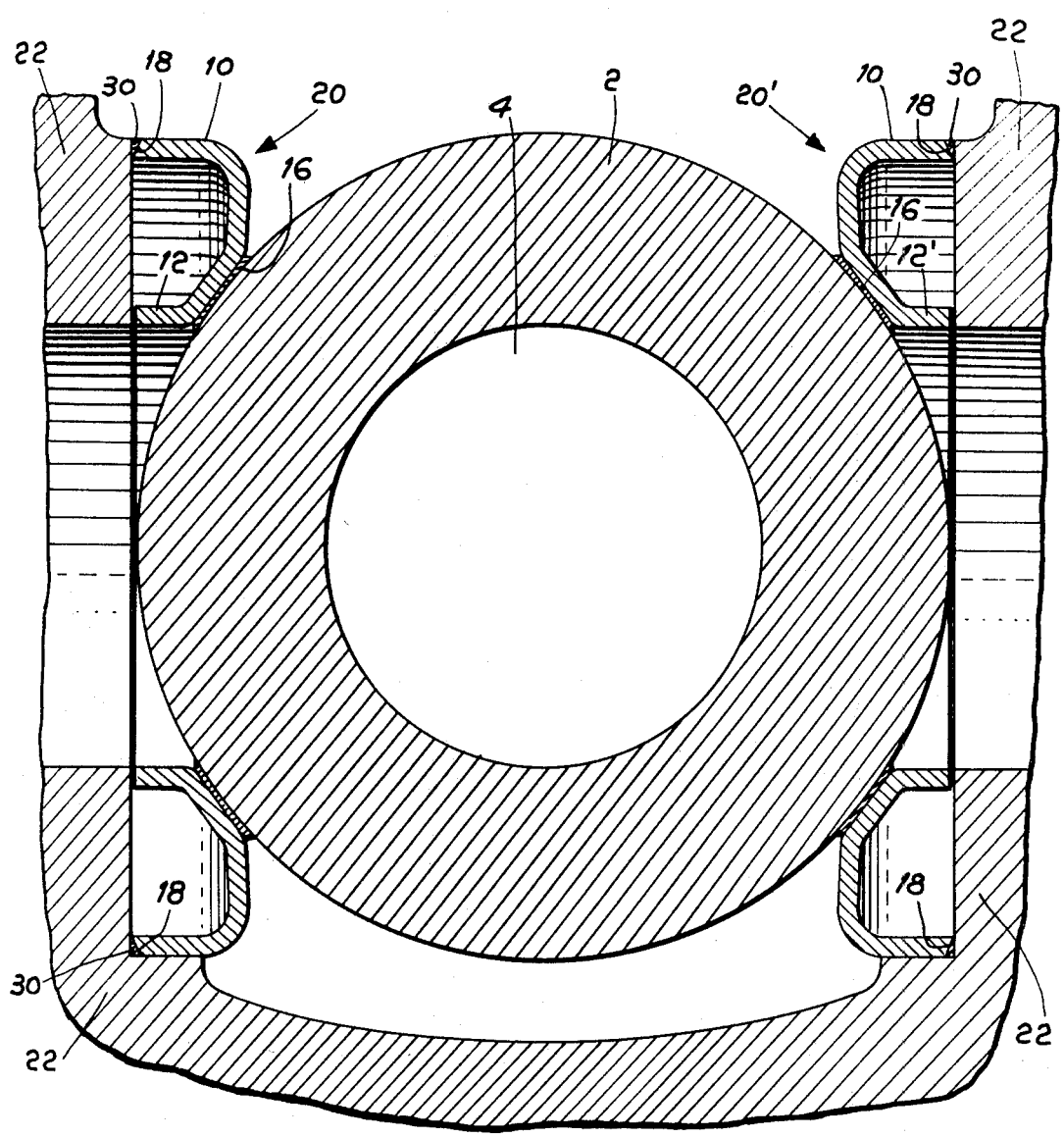
FIG. 5 is a cross-sectional view of the inventive seat in engagement with the ball of a ball valve in the closed position.

After insertion of the ball and seat assembly into the valve chamber as shown in FIG. 4, the ball is rotated 90° causing the soft metal layer to be crushed, thereby providing a surface contour that conforms to the surface of the ball. This crushed surface than provides an excellent seal between the valve seat and the ball. Obviously, the ball material must be harder than the soft metal layer in order to accomplish the required crushing. Further, the metal should be soft enough so as not to damage the ball after repeated rotations. It is to be noted that the soft metal is crushed or compressed when the ball is rotated and not sheared away as shearing would result in the ball contacting the hard metal seat. As above described, gaps 28 and 28' absorb the interference fit of the ball when the valve is in the closed position as shown in FIG. 5.

FIG. 7 illustrates a complete top entry ball valve assembly. Ball 2 communicates with inlet and outlet ports 24 and 26 of valve body 22 via seats 20 and 20' respectively. Valve stem 32, having a handle 34 coupled thereto, communicates with ball 2 via extension 36. Handle 34 is secured to stem 32 by any suitable means, for example, a nut 38 and stop nut 40. A cover 42 is secured by cap screws 44 and 48. Sealing is provided by stem seal 50, gasket 52 and thrust washer 54. When necessary, the ball and seat assembly may be replaced by merely removing cover 42 and extracting the ball and seat assembly.

In summary, the inventive non-spherical ball and seat assembly provide a wedging action and mechanical advantage normally provided by separate actuators in other types of valves. This eliminates the need for time-consuming and costly lapping required by the prior art. Further, replacement of the valve seats is possible without the need for providing a new ball since the ball and valve seats are no longer matched sets as is the case when the ball and seats are lapped together. Most importantly, the inventive arrangement provides a sealing surface which meets current leakage specifications.

While the principles of this invention have been described above in connection with specific apparatus, it is to be understood that this description is made only by way of example and not as a limitation on the scope of the invention as set forth in the objects and features thereof and in the accompanying claims.

What is claimed is:

1. A metallic valve seat, for use in a valve housing defining a chamber and inlet and outlet ports, said chamber having a closure member therein, comprising:
    a first metal portion, stamped from a sheet of resilient metal and having a substantially U-shaped cross-section with a base and first and second concentrically disposed legs, for engaging said housing around one of said inlet and outlet openings; and
    a soft deformable metal layer deposited on said base for engaging said closure member.

2. A metallic valve seat according to claim 1 wherein said first metal is stainless steel.

3. A metallic valve seat according to claim 1 wherein said first metal is Iconel 718.

4. A metallic valve seat according to claim 1 wherein said soft deformable metal is selected from the group consisting of silver, gold, cadmium, nickel and copper.

5. A metallic valve seat according to claim 1, wherein said first leg is longer than said second leg by a predetermined amount and said first leg provides a metal contact for said housing.

6. A metallic valve seat according to claim 5 wherein said first leg has an end having a soft metal coating thereon for contacting said housing.

7. A metallic valve seat according to claim 5 wherein said second leg substantially engages said housing when said seat is stressed by said closure member.

8. A metallic valve seat, for use in a valve housing, defining a chamber and inlet and outlet ports, said chamber having a closure member therein, comprising:

a first metal portion stamped from a metal sheet and having a substantially U-shaped cross-section with first and second legs and a base, said first leg being longer than said second leg by a predetermined amount and having a beveled end for engaging said housing around one of said inlet and outlet openings for providing a line contact therewith to provide a high pressure seal; and a soft metal layer deposited on a region of said first portion for engaging said closure member.

* * * * *